United States Patent
Sillince

[11] Patent Number: 6,125,649
[45] Date of Patent: Oct. 3, 2000

[54] HEAT EXCHANGER UNIT WITH CONDUCTIVE DISCS

[75] Inventor: Mark Sillince, Eaton Bray Dunstable, United Kingdom

[73] Assignee: Chill-Can International, Inc., Laguna Niguel, Calif.

[21] Appl. No.: 09/247,877

[22] Filed: Feb. 10, 1999

[51] Int. Cl.[7] ................................................. F25B 17/08
[52] U.S. Cl. ............................... 62/480; 62/294; 62/371
[58] Field of Search ............................... 62/480, 294, 60, 62/371, 293, 5

[56] References Cited

U.S. PATENT DOCUMENTS

| | | |
|---|---|---|
| 5,331,817 | 7/1994 | Anthony ................................ 62/371 X |
| 5,384,101 | 1/1995 | Rockenfeller ......................... 62/480 X |
| 5,606,866 | 3/1997 | Anthony et al. ......................... 62/294 |
| 5,692,381 | 12/1997 | Garrett ................................. 62/480 X |
| 5,692,391 | 12/1997 | Joslin ................................... 62/371 X |
| 5,765,385 | 6/1998 | Childs .................................. 62/371 X |
| 5,845,501 | 12/1998 | Stonehouse et al. ................ 62/294 X |
| 5,931,005 | 8/1999 | Garrett et al. ......................... 62/480 X |
| 5,943,875 | 8/1999 | Hymes ..................................... 62/294 |

Primary Examiner—William Doerrler
Assistant Examiner—Chen-Wen Jiang
Attorney, Agent, or Firm—Fulbright & Jaworski L.L.P.

[57] ABSTRACT

A heat exchange unit for use in containers for cooling a food or beverage. The heat exchange unit includes inner end outer vessels with inner vessel having a plurality of thermally conductive discs in thermally conductive contact with an inner surface thereof. An adsorbent material is disposed between adjacent discs is compacted between them to provide maximum adsorbent material per unit volume. The outer surface of the inner vessel defines a plurality of grooves and is in thermally conductive contact with the inner surface of the outer vessel. The grooves provide flow paths for a gas such as carbon dioxide which is adsorbed onto the adsorbent material to flow and exit the heat exchange unit and to carry with it, the heat contained in the food or beverage, thereby lowering its temperatures.

8 Claims, 3 Drawing Sheets

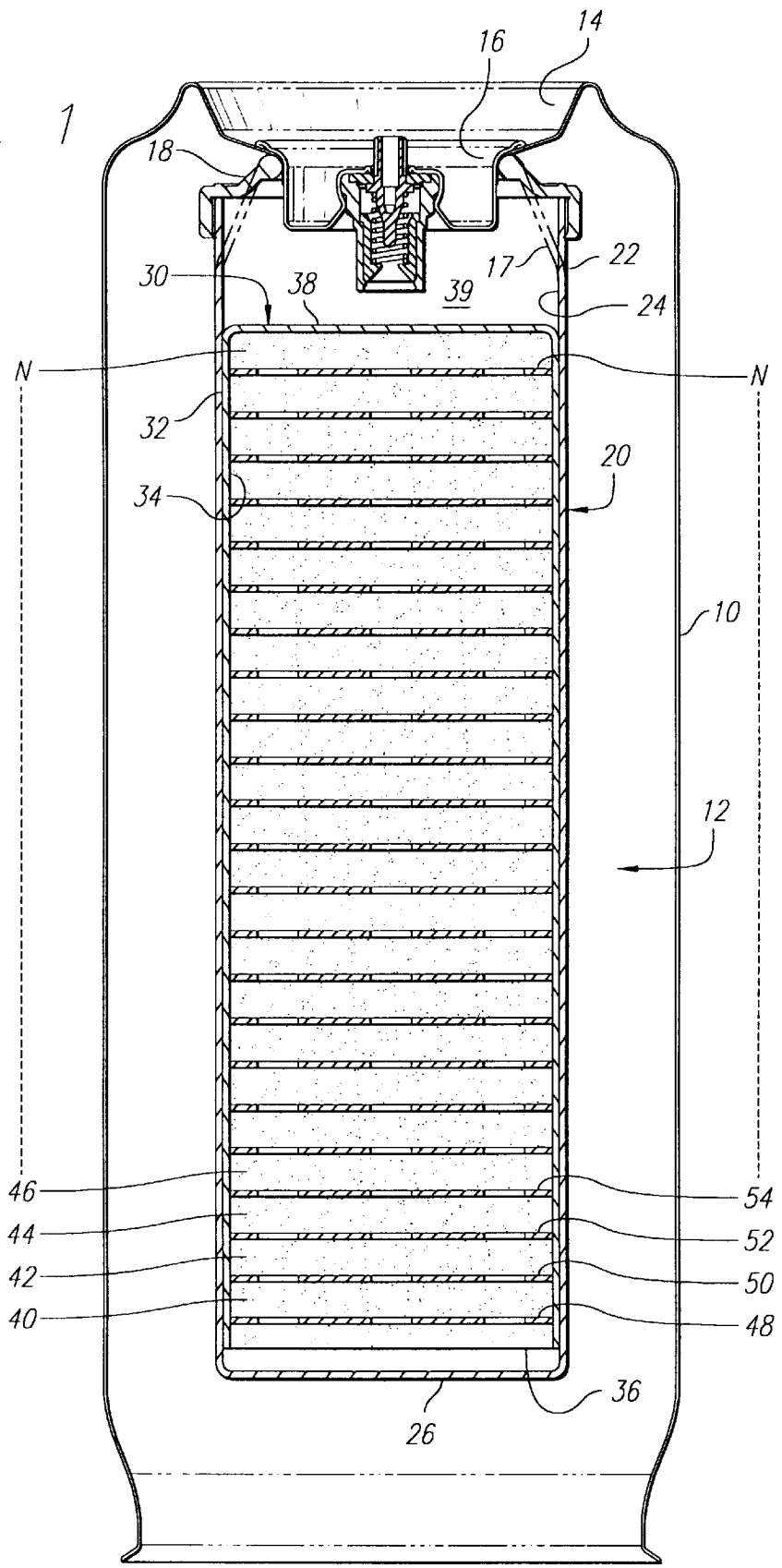

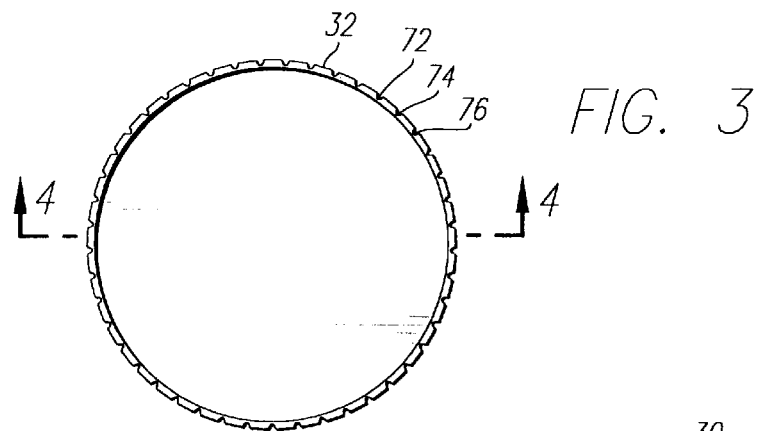
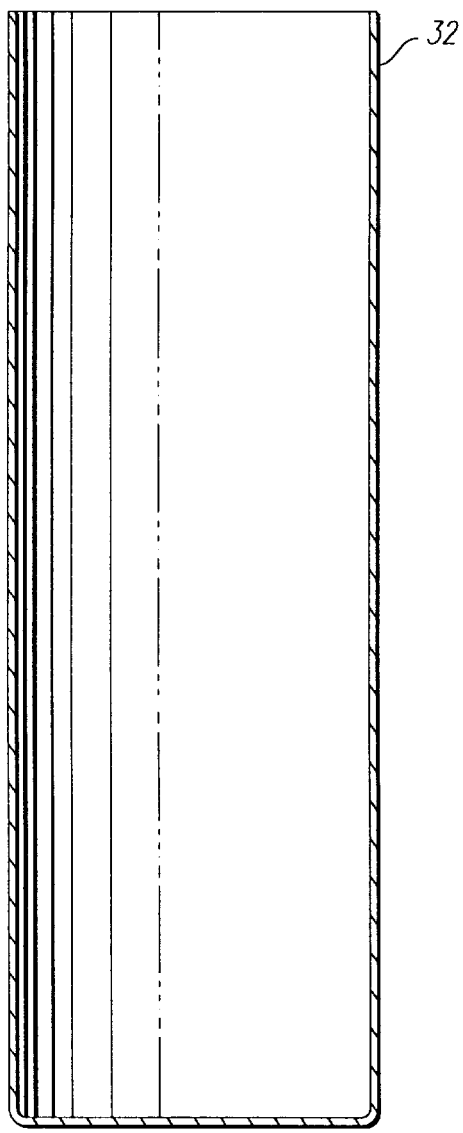
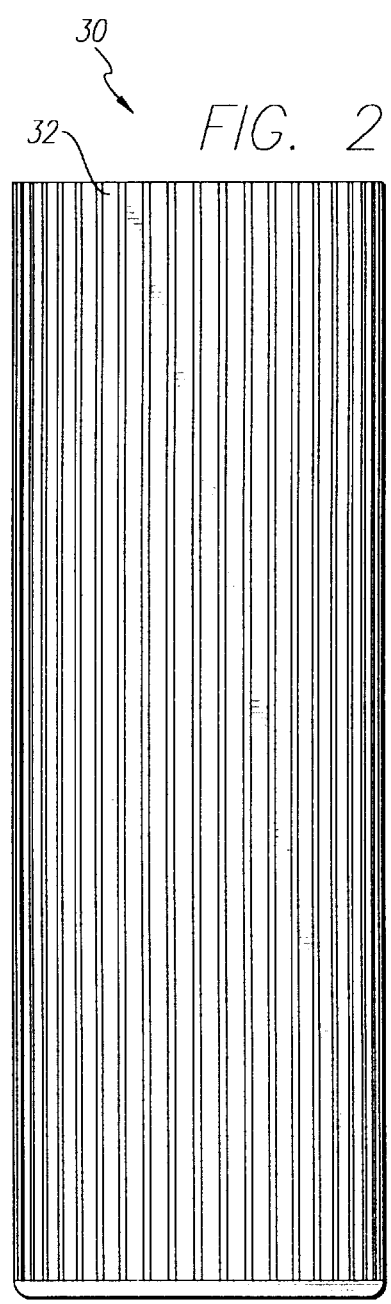

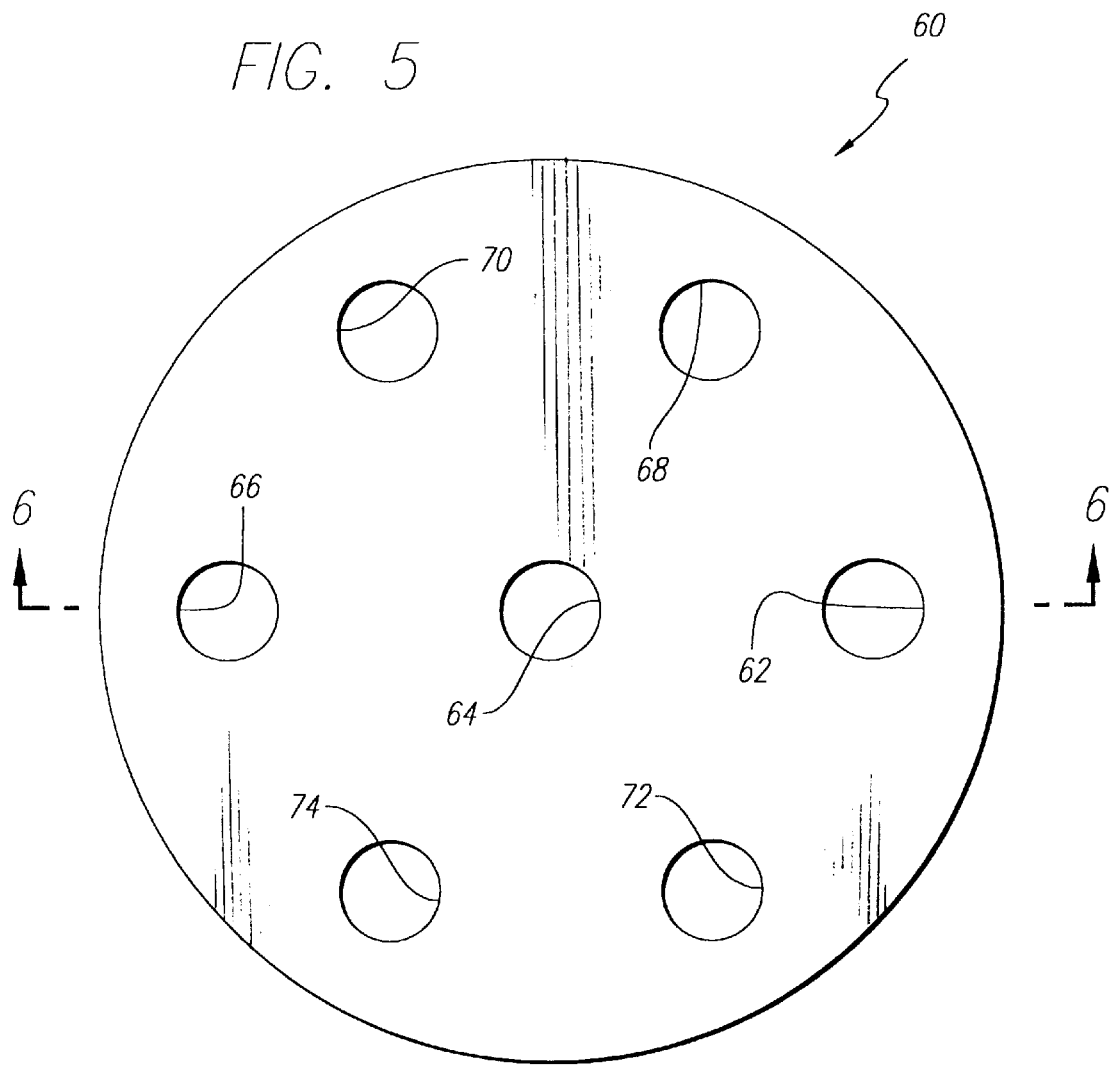
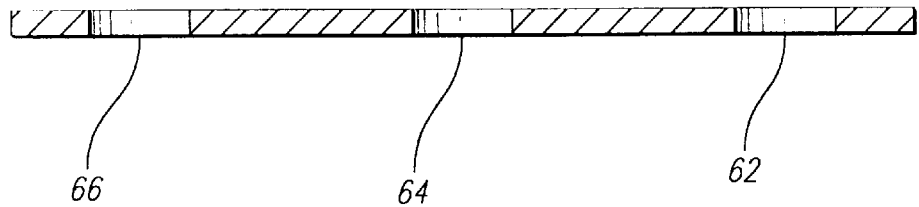

HEAT EXCHANGER UNIT WITH CONDUCTIVE DISCS

FIELD OF THE INVENTION

The present invention relates generally to a heat exchange unit for use in containers for self-chilling foods or beverages and more particularly to a heat exchange unit of the type in which temperature reduction is caused by the desorption of a gas from an adsorbent disposed within the heat exchange unit.

DESCRIPTION OF THE ART

Many foods or beverages available in portable containers are preferably consumed when they are chilled. For example, carbonated soft drinks, fruit drinks, beer, puddings, cottage cheese and the like are preferably consumed at temperatures varying between 33° Fahrenheit and 50° Fahrenheit. When the convenience of refrigerators or ice is not available such as when fishing, camping or the like, the task of cooling these foods or beverages prior to consumption is made more difficult and in such circumstances it is highly desirable to have a method for rapidly cooling the content of the containers prior to consumption. Thus a self-cooling container, that is, one not requiring external low temperature conditions is desirable.

The art is replete with container designs which incorporate a coolant capable of cooling the contents without exposure to the external low temperature conditions. The vast majority of these containers incorporate or otherwise utilize refrigerant gases which upon release or activation absorb heat in order to cool the contents of the container. Other techniques have recognized the use of endothermic chemical reactions as a mechanism to absorb heat and thereby cool the contents of the container. Examples of such endothermic chemical reaction devices are those disclosed in U.S. Pat. Nos. 1,897,723, 2,746,265, 2,882,691 and 4,802,343.

Typical of devices which utilize gaseous refrigerants are those disclosed in U.S. Pat. Nos. 2,460,765, 3,373,581, 3,636,726, 3,726,106, 4,584,848, 4,656,838, 4,784,678, 5,214,933, 5,285,812, 5,325,680, 5,331,817, 5,606,866, 5,692,381 and 5,692,391. In many instances the refrigerant gas utilized in a structure such as those shown in the foregoing U.S. Patents do not function to lower the temperature properly or if they do, they contain a refrigerant gaseous material which may contribute to the greenhouse effect and thus is not friendly to the environment.

To solve problems such as those set forth above in the prior art, applicant is utilizing as a part of the present invention an adsorbent-desorbent system which may comprise adsorbent materials such as zeolites, cation zeolites, silicagel, activated carbons, carbon molecular sieves and the like. Preferably the present invention utilizes activated carbon which functions as an adsorbent for carbon dioxide. A system of this type is disclosed in U.S. Pat. No. 5,692,381 which is incorporated herein by reference.

In these devices the adsorbent material is disposed within a vessel, the outer surface of which is in contact thermally with the food or beverage to be cooled. Typically, the vessel is connected to an outer container which receives the food or beverage to be cooled in such a manner that it is in thermal contact with the outer surface of the vessel containing the adsorbent material. This vessel or heat exchange unit is affixed to the outer container typically to the bottom thereof and contains a valve or similar mechanism which functions to release a quantity of gas, such as carbon dioxide which has been adsorbed by the adsorbent material contained within the inner vessel. When opened the gas such as carbon dioxide is desorbed and the endothermic process of desorption of the gas from the activated carbon adsorbent causes a reduction in the temperature of the food or beverage which is in thermal contact with the outer surface of the inner vessel thereby lowering the temperature of the food or beverage contained therein.

To accomplish this cooling it is imperative that as much carbon dioxide be adsorbed onto the carbon particles contained within the inner vessel and further that the thermal energy contained within the food or beverage be transferred therefrom through the wall of the inner vessel and through the adsorbent material to be carried out of the heat exchange unit along with the desorbed carbon dioxide gas. It is known in the art that most adsorbents are poor conductors of thermal energy. For example, activated carbon can be described as an amorphic material and consequently has a low thermal conductivity. By compacting the activated carbon to the maximum amount while still permitting maximum adsorption of the carbon dioxide gas thereon does assist some in conduction of thermal energy. However, sufficient thermal energy conduction is not accomplished simply by the compaction of the carbon particles. To allow better heat transfer of the heat contained in the food or beverage it is necessary to incorporate a thermal conductivity enhancer heat transfer means which will assist in conducting heat from the surface of the inner vessel through the carbon particles disposed within the inner vessel to be carried out with the desorbed carbon dioxide gas as it leaves the heat exchange unit.

As above pointed out one of the problems with conventional arrangements utilizing adsorbent desorbent systems is that the flow of desorbed gas does not efficiently remove the heat from the food or beverage in contact with the outer surface of the heat exchange unit. Although part of the desorbed gas leaves the adsorbent material adjacent the nearest wall and then travels along the vessel wall to the exit valve, a significant portion also permeates through the adsorbent and through the exit valve of the vessel without coming into contact with the vessel wall and thus a significant amount of the potential cooling capability of the desorbed gas is effectively wasted. Also, as above pointed out, it is important that the adsorbent material, such as the activated carbon particles, be compacted as highly as possible without substantially reducing the porosity of the body of adsorbent material to such a degree that its capability of adsorbing the carbon dioxide gas or the retardation of the rate of desorption from within the body of the absorbent is not deleteriously affected.

SUMMARY OF INVENTION

A heat exchange unit for use in a container for chilling a food or beverage contained therein wherein the heat exchange unit includes a thermally conductive outer vessel having a wall with inner and outer surfaces and a closed end. A second vessel having an open end inserted within and in thermal contact with the inner surface of the outer vessel to provide a thermally conductive path therebetween. The outer surface of the inner vessel defining with the inner wall of the outer vessel a plurality of passage ways for conducting gas. Said inner vessel being disposed with its open end adjacent the closed end of said outer vessel. The interior of said inner vessel having disposed therein a plurality of layers of an adsorbent material with thermally conductive discs disposed between adjacent layers of said adsorbent material.

BRIEF DESCRIPTION OF THE DRAWINGS

FIG. 1 is a cross-sectional schematic illustration of a beverage can containing a heat exchange unit constructed in accordance with the principles of the present invention assembled with a beverage can;

FIG. 2 is an elevational view of the inner vessel and the heat exchange unit shown in FIG. 1;

FIG. 3 is a top elevational view thereof;

FIG. 4 is a cross-sectional view thereof taking above the lines 4—4 of FIG. 3;

FIG. 5 is a plan view of a conductive disc disposed within the inter vessel shown in FIGS. 2–4; and FIG. 6 is a cross-sectional view of the conductive disc taken above the lines 6—6 of FIG. 5.

DETAILED DESCRIPTION

Referring now to the drawings there is shown in FIG. 1 a beverage can 10 having disposed therein a heat exchange unit 12. The heat exchange unit 12 is affixed to the bottom 14 of the beverage can 10 through the utilization of a valve mechanism 16 which is secured by crimping to an opening in a cap 18 secured to the top of the heat exchange unit and closing the same. As shown by the dashed line 17 the cap 18 may be dispensed with and the heat exchange unit may be formed or necked inwardly as a unitary vessel which is secured to the valve mechanism 16.

The heat exchange unit 12 includes an outer vessel 20 which includes an outer wall 22 and an inner wall 24 and a closed bottom 26. Also included as part of the heat exchange unit is an inner vessel 30 having an outer wall 32 and an inner wall 34 and an open end 36. The end opposite the open end 36 namely end 38 is closed.

Disposed within the interior of the inner vessel 30 is a plurality of layers 40, 42, 44, 46 - - - N of adsorbent material. The use of the designator N indicates that there may be any number of layers as may be needed for the application under consideration depending upon the food or beverage to be chilled and the amount of adsorbent to be contained within the heat exchange unit. Also disposed within the interior of the inner vessel 30 are a plurality of thermally conductive discs 48, 50, 52, 54 - - - N again indicating that there may be any number of such thermally conductive discs. As is illustrated, the discs are spaced apart and layers of adsorbent material such as activated carbon 40, 42, 44, 46 - - - N are interposed between adjacent ones of the thermally conductive discs. Each of the thermally conductive discs is in thermally conductive contact with the inner surface 34 of the inner vessel 30 and extends completely thereacross. Preferably the inner and outer vessels as well as the beverage can 10 are cylindrical in construction and the discs are also cylindrical in construction.

As is more clearly shown in FIGS. 5 and 6 to which reference is hereby made a thermally conductive disc such as shown at 60 includes a plurality of openings as shown at 62 through 74 defined therethrough. Although there are seven such openings shown in the disc 60 there may be any number desired depending upon the particular construction desired. As is illustrated particularly in FIG. 6 the disc 60 is formed of solid material except for the openings 62 through 74 therethrough. The diameter of the disc 60 is such that it is press fitted into the interior of the inner vessel 30 of the heat exchange unit 12 so that the outer periphery 76 accomplishes an interference fit with the inner surface 34 of the inner vessel 30 and is in excellent thermally conductive contact therewith. By the interference fit the disc is also mechanically secured to the inner vessel 30 for reasons to be explained hereinafter.

During construction what typically will occur is that the layers of adsorbent material are placed into the inner vessel 30 with the first being such that it contacts the bottom 38 thereof. After the layer of material is disposed within the inner vessel and against the bottom 38 thereof the top most (as viewed in FIG. 1) thermally conductive disc such as shown at 60 is inserted in place and press fitted so that there is an intimate thermal contact with the inner surface 34 of the inner vessel 30. If desired, pressure can be applied to compress the adsorbent particles, such as particles of activated carbon, to the extent desired to enable adsorption of a maximum amount of a gas to be inserted under pressure therein, such for example as carbon dioxide. Additional layers of the activated carbon can then be disposed one after the other with a thermally conductive disc being placed thereon and press fitted into the inner vessel 30 with appropriate compression as above-described until the entire vessel 30 is filled with layers of the activated carbon adsorbent material sandwiched between thermally conductive members such as the discs or the bottom of the inner vessel 30. As will now be appreciated, by securing the discs 60 mechanically the integrity of the compaction of the carbon particles is maintained.

It should be recognized that it is very important to compact the carbon particles to the maximum extent possible without destroying the ability of the particles to adsorb the carbon dioxide gas. Such compaction is required to obtain the greatest amount of carbon particles within the given space allocated within a particular heat exchange unit. The greater the amount of carbon the larger the amount of carbon dioxide gas can be adsorbed per unit volume which, in turn, increases the cooling effect. That is, more carbon given, more carbon dioxide gas adsorbed, which give more cooling on desorption. Therefore, it is seen that the plurality of thermally conductive discs when inserted, compact the carbon particles and since the discs achieve an interference fit with the interior surface 34 of the container 30, the compaction of each layer is retained permanently.

As is illustrated in FIGS. 2–4 the inner vessel 30 includes an outer surface 32 which has a diameter which is substantially identical to the inner diameter of the outer vessel 20 so that the inner vessel with its open end 36 facing the closed end 26 of the outer vessel is pressed fitted into the outer container. By such press fitting, the outer surface 32 of the inner vessel 30 is in intimate thermal conductivity with the outer vessel 20. Along the surface 32 of the inner vessel 30 there are provided a plurality of grooves or slots as shown at 72, 74 and 76 in FIG. 3. These slots although illustrated as being vertical may be provided in any configuration desired such as helical, in a spiral fashion, tartiutous or the like. The function of the slots is to provide along the inner surface 24 of the outer container 20 a passageway through which gaseous material may pass when the same is flowing in the heat exchange unit. The flowing of such gas, such as carbon dioxide under pressure, will occur during two separate events. The first of these is when the heat exchange unit is charged with the gas such as carbon dioxide to be adsorbed onto the particles of adsorbent material such as the activated carbon particles contained within the interior of the inner vessel 30. Subsequently, when the valve 16 is activated by depressing the same downwardly the adsorbed gas under pressure is released and upon being desorbed will try to escape through the valve 16 to the atmosphere. By providing the holes in the conductive disc 60 as shown in FIGS. 5 and 6 and the slots or grooves as shown in FIGS. 2 and 3 in the outer surface 32 of the inner vessel 30 the desorbed gas will flow out of the open-end 36 of the inner vessel 30 and through the passageways formed by the slots or grooves, 72, 74, 76 and the inner wall of the outer vessel 20 into the chamber 39 and then the valve 16. The openings such as shown as 62, 64 and 66 in the disc 60 will provide pathways for the desorbed gas to flow through the layers of carbon out of the open-end 36 and up through the passage ways along the outer surface of the inner vessel 30. This will provide a flow path for the desorbed gas to contact the wall of the outer vessel 20 and as the desorbed gas travels through the passage ways to cause the heat contained in the food or beverage which is in contact with the outer surface 22 of the outer vessel 20 to be conducted away from the food or beverage and with the desorbed gas into the atmosphere. This will enhance the cooling effectiveness of the heat exchange unit.

It will also be recognized that the intimate thermal contact between the walls of the inner and outer vessels and the discs causes the heat contained within the food or beverage to also be conducted internally of the heat exchange unit and into contact with the carbon particles. This heat transfer enhances the desorption process therefore releasing more carbon dioxide gas from the carbon particles. As the carbon dioxide gas is desorbed, it passes downwardly (FIG. 1) through the openings in the discs and out the open end of the inner vessel and upwardly to the chamber 39. There is thus provided a dual heat flow path thus increasing the effectiveness of the heat exchange unit.

What is claimed is:

1. A heat exchange unit for use in a container for chilling a food or beverage contained therein comprising:
    (a) a thermally conductive outer vessel having a wall including a first outer and a first inner surface, said first outer surface adapted to contact said food or beverage, said outer vessel having a first closed end;
    (b) an open ended thermally conductive inner vessel having a wall including a second outer surface a second inner surface, and a second closed end, said second outer surface being in thermally conductive contact with said first inner surface;
    (c) said second outer surface defining a plurality of grooves extending completely there along;
    (d) said inner vessel being received within said outer vessel with the open end thereof facing the closed end of said outer vessel; and
    (e) a plurality of layers of adsorbent material in said inner vessel interposed between a plurality of thermally conductive discs each being in thermally conductive contact with said second inner surface, each of said discs defining a flow path therethrough, said adsorbent material extending through said flow paths.

2. A heat exchange unit as defined in claim 1, which further includes valve means affixed to an end of said outer vessel opposite said first closed end.

3. A heat exchange unit as defined in claim 2, which further includes a chamber in said outer vessel between said valve means and said second closed end, said chamber being in communication with said grooves.

4. A heat exchange unit as defined in claim 2, which further includes a refrigerant gas under pressure adsorbed to said adsorbent material.

5. A heat exchange unit as defined in claim 4, wherein said adsorbent material is carbon and said gas is carbon dioxide.

6. A heat exchange unit as defined in claim 2, wherein said grooves extend vertically from said open end to said second closed end.

7. A self chilling food or beverage container comprising
    an outer container for containing said food or beverage and a heat exchange unit affixed to said outer container, said heat exchange unit comprising:
    (a) a thermally conductive outer vessel having a wall including a first outer and a first inner surface, said first outer surface adapted to contact said food or beverage, said outer vessel having a first closed end;
    (b) an open ended thermally conductive inner vessel having a wall including a second outer surface a second inner surface, and a second closed end, said second outer surface being in thermally conductive contact with said first inner surface;
    (c) said second outer surface defining a plurality of grooves extending completely there along;
    (d) said inner vessel being received within said outer vessel with the open end thereof facing the closed end of said outer vessel;
    (e) a plurality of layers of adsorbent material in said inner vessel interposed between a plurality of thermally conductive discs each being in thermally conductive contact with said second inner surface, each of said discs defining a plurality of openings therethrough, said adsorbent material extending through said openings;
    (f) each of said discs defining an interference fit with said second inner surface and said adsorbent material comprises carbon particles.

8. A heat exchange unit as defined in claim 7 wherein each of said discs compacts the carbon particles adjacent thereto.

* * * * *